Oct. 18, 1927.
J. M. WHITE
1,646,227
AUTOMOBILE LOCK
Filed Jan. 9, 1922
3 Sheets-Sheet 2
FIG. 3.
FIG. 4.
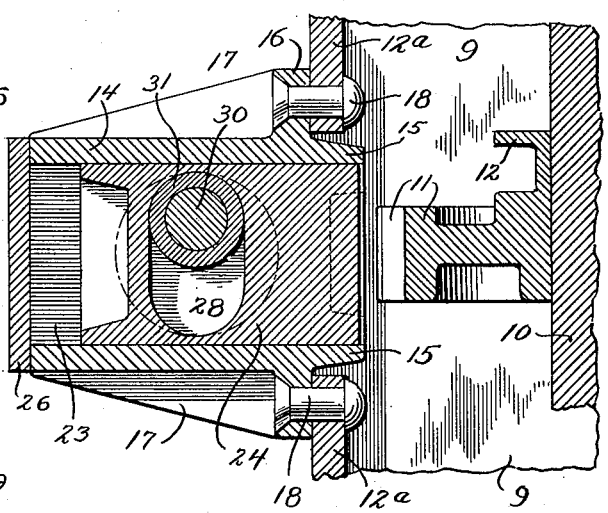
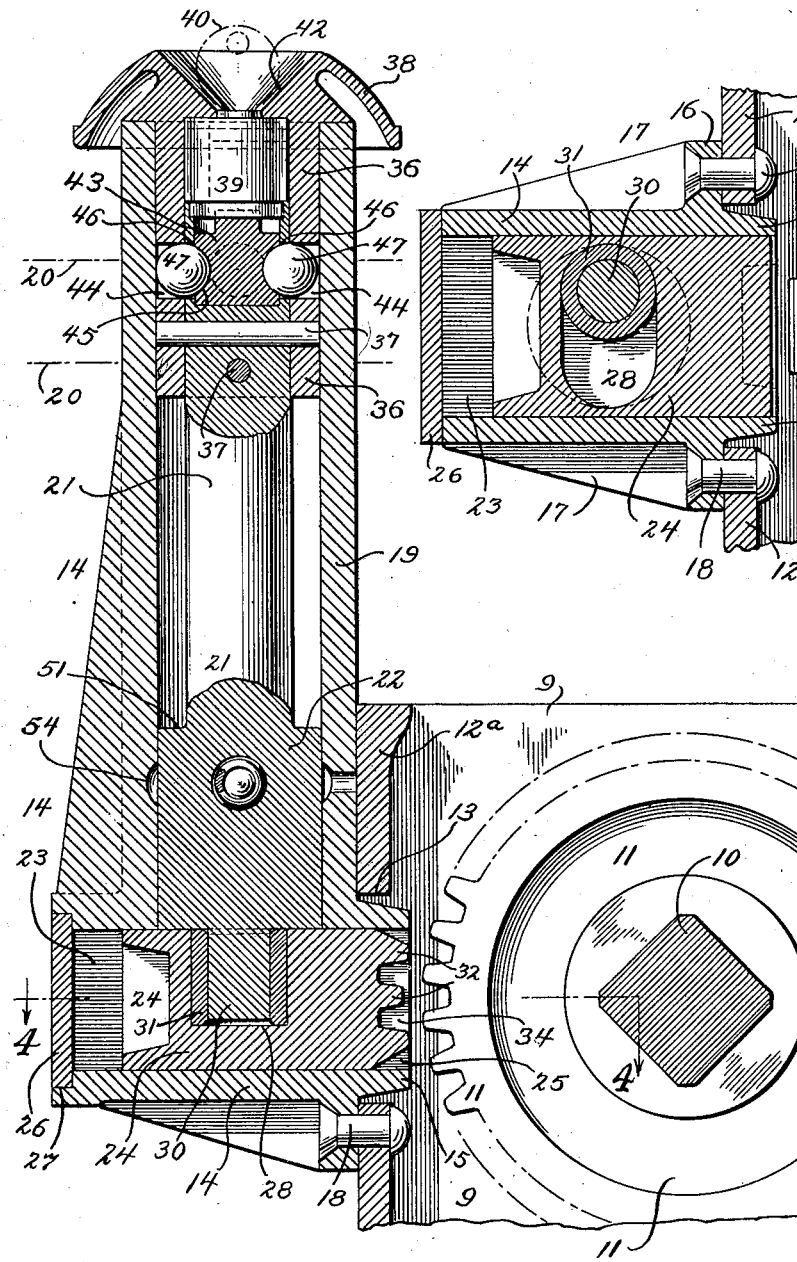
WITNESSES:
Lynn Brodton
Augustus B. Coppes
INVENTOR
Jessee M. White
by Joshua R. H. Potts
his ATTORNEY Oct. 18, 1927.
J. M. WHITE
1,646,227
AUTOMOBILE LOCK
Filed Jan. 9, 1922   3 Sheets-Sheet 3
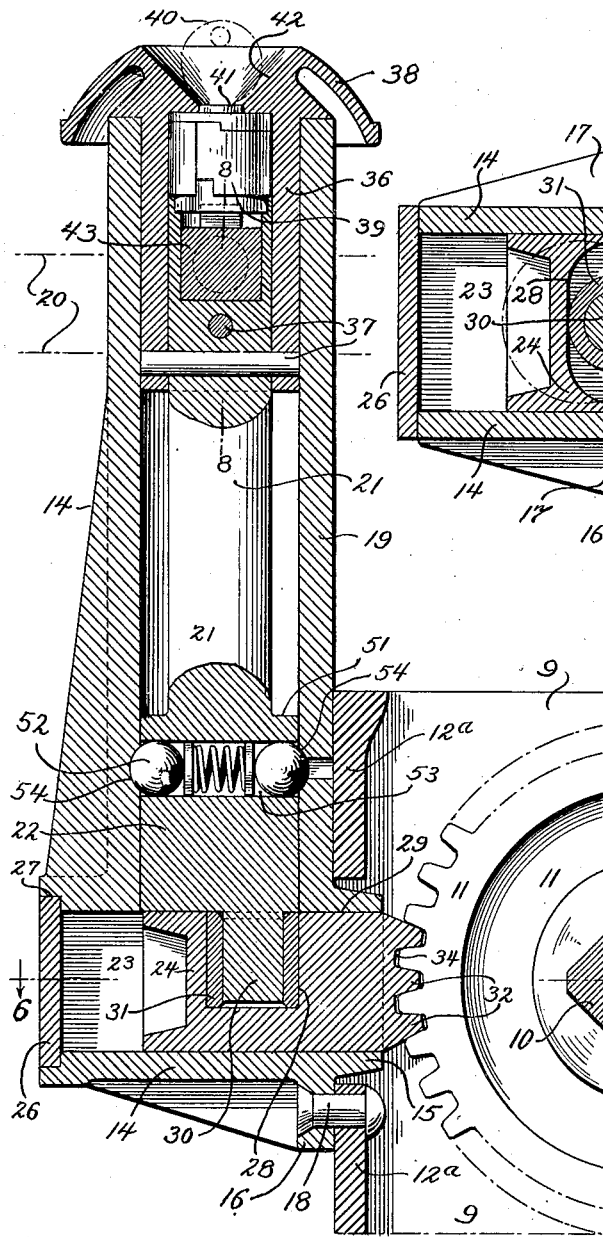
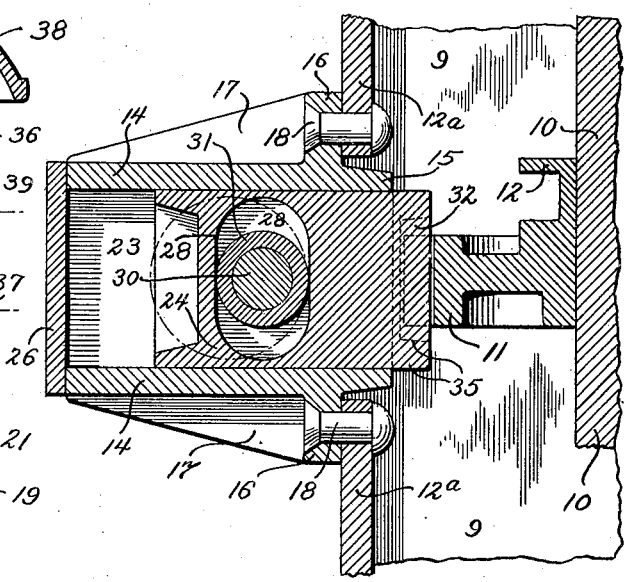
WITNESSES:
Lynn Brodton
Augustus B. Coppes
INVENTOR
Jessee M. White
by Joshua R. H. Potts
his ATTORNEY Patented Oct. 18, 1927.

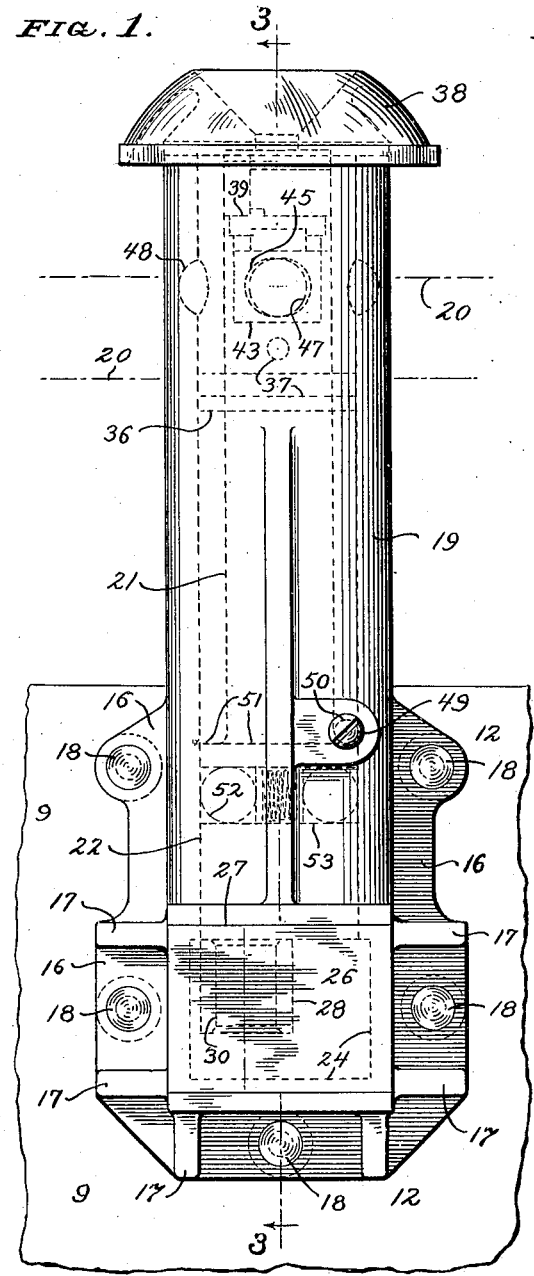

1,646,227

UNITED STATES PATENT OFFICE.

JESSEE M. WHITE, OF PHILADELPHIA, PENNSYLVANIA.

AUTOMOBILE LOCK.

Application filed January 9, 1922. Serial No. 527,824.

One object of my invention is to provide an improved locking device of simple and durable construction which will be effective in preventing the theft of an automobile upon which it is placed.

Another object is to so construct the locking device of my present invention that it can be readily applied to an automobile without requiring much change or alteration in the construction of the automobile.

A further object is to so make my improved device that it can be readily operated either into a locked or unlocked position by an authorized person but cannot be readily tampered with by a thief.

These objects, and other advantageous ends which will be described hereinafter, I attain in the following manner, reference being had to the accompanying drawings in which Figure 1 is a front elevation of my improved locking device showing the parts in their unlocked position, Figure 2 is a side elevation of said device removed from the transmission gear case, Figure 3 is a section taken on the line 3—3 of Figure 1, Figure 4 is a section taken on the line 4—4 of Figure 3, Figure 5 is a section of the same general character as shown in Figure 3 illustrating the parts in their locked position, Figure 6 is a section taken on the line 6—6 of Figure 5, Figure 7 is a perspective view of one of the parts of my invention, and Figure 8 is a fragmentary section taken on the line 8—8 of Figure 5.

Referring to the drawings, 9 represents a transmission gear case of an automobile having therein a shaft 10 such for example as a transmission shaft which must rotate in order to impart movement to the ground-engaging wheels for the purpose of propelling the vehicle. Upon this shaft is a gear wheel 11 such for example as the gear commonly known as "low and reverse gear" which must be slid lengthwise or rotated in order to move the automobile. This gear wheel 11 is slidably keyed on the shaft 10 and includes a flanged collar 12 which is adapted to be shifted by the usual shifting lever employed in an automobile for the purpose of effecting rotation of the shaft 10. The principal purpose of my improved device is to lock this gear wheel 11 against rotation and against shifting movement lengthwise on the shaft 10 when the gear wheel 11 is in its neutral position; it being noted that if the gear wheel 11 is thus locked against shifting movement it cannot be moved into engagement with any other of the driving gears in the transmission case.

The side wall 12ª of the transmission case 9 has an aperture 13 extending therethrough directly opposite the peripheral face of the gear wheel 11 when the latter is in its neutral position as illustrated. A housing 14 for the locking parts of my invention includes a boss or lug 15 which projects into the aperture 13 of the transmission case. This housing 14 also has lateral flanges 16 which are riveted to the side wall 12ª of the transmission case 9 and these flanges can be reinforced by ribs 17; the rivets being illustrated at 18.

The housing 14 includes a tubular standard 19 which projects upward to such height as to pass through a hole in the floor 20 of the automobile to which the device is attached. An actuating spindle 21 has a cylindrical portion rotatably fitting within the lower portion of the standard 19, and having an enlarged portion 22 providing a shoulder 51. A transversely extending slideway 23 is formed in the housing 14 directly below the portion 22 of the actuating spindle and within this slideway is positioned a bolt 24. This slideway has an open end 25 which extends through the boss 15 and communicates with the interior of the transmission case. The outer end of the slideway 23 is preferably closed by a plate 26 which is fitted within a recess 27 and this plate, if desired, can be brazed or welded so as to actually form an integral part of the housing 14 and prevent access to the slideway 23 and bolt 24. The bolt 24 has a cavity 28 extending downward from its top surface 29; said cavity being elongated transversely. The lower end of the cylindrical portion 22 of the spindle 21 has a projection or pin 30 of cylindrical form which fits in a ring or bushing 31; the latter being positioned within the cavity 28. This pin or projection 30 is positioned eccentrically to the axis of rotation of the spindle 21 within the tubular standard 19 so that it will be noted that when the actuating spindle 21 is partially rotated, from the position shown in Figures 3 and 4 to the position shown in Figures 5, and 6, that the bolt 24 will be slid within the slideway 23.

The bolt 24, at its inner end, has teeth or ribs 32 spaced apart in the direction of its height. The top and bottom surfaces of the bolt adjacent said inner end being beveled as shown at 33 so that the bolt tapers at said inner end. These teeth or ribs provide spaces or notches 34 which are closed at their sides by portions 35 of the bolt. Thus the spaces or notches 34 are closed at their sides by the portions 35 and closed at their tops and bottoms by the teeth or ribs 32. These teeth or ribs are of such size that when the bolt is moved as above stated and the gear wheel 11 is in its neutral position, said teeth or ribs will project into the spaces between the teeth of the gear wheel 11 and the portions 35 of the bolt will be located at opposite sides of the teeth of the gear wheel with which the ribs 32 mesh so that when the bolt is in the position shown in Figures 5 and 6, the gear wheel cannot be rotated nor can it be slid lengthwise on the shaft to such extent as would allow the operation of the automobile upon which the device is mounted. As a means for locking, unlocking and rotating the spindle 21, I provide the following mechanism.

A sleeve 36 rotatably fits in the upper end of the housing standard 19 and is secured to the spindle by pins 37. A knob 38 is formed on the top of the sleeve and abuts the top end of the standard. Any well known form of lock, such for example as a "pin" lock of the "Yale" or "Corbin" type is positioned within the sleeve and has a rotatable portion 39 which, when the lock is actuated by the insertion of a proper key 40 within a key hole 41 formed in the lock at the lower end of a depression 42 in the knob 38, can rotate a cylindrical actuator 43 which is rotatably mounted in the upper end of the spindle 21. The sleeve 36 has holes 44 which are opposed to cavities 45 in the actuating portion 43 and the spindle 21 has holes 46 which register with the holes 44.

Metallic balls 47 are positioned within the holes 44 and 46 and cavities 45 when the parts are in their unlocked position, such for example as shown in Figure 3. The tubular standard 19 has recesses 48 into which portions of the balls 47 can be projected after the actuating spindle is rotated to project the bolt into locking engagement with the gear wheel and this action of the balls is carried out upon the turning of the key to permit the removal of the key. It will be noted that the rotation of the portion 43 by the key independently of the rotation of the spindle will cause the balls to be forced out of the cavities 45, in other words, from the position shown in Figure 3 to the position shown in Figure 8. It will be further noted that this action not only locks the spindle against rotation within the tubular standard but also prevents the spindle from being lifted bodily out of the tubular standard.

As a means for preventing the upward movement of the spindle within the housing when the parts are unlocked, I provide a screw 49 within the housing; said screw having a portion 50 which projects over the upper surface 51 of the enlarged cylindrical portion 22. Furthermore, as a means for preventing accidental rotation of the spindle and also for the purpose of insuring that the holes 44 are in registry with the recess 48 when the device is actuated, I provide spring-pressed balls 52 in a transverse passage 53 in the portion 22 of the spindle and these balls move into recesses 54 in the housing. Thus the balls 52 serve as position finders and cause the cylinder to stop at the proper position to allow the balls 47 to be moved into the recess 48 and the operator thus knows when to turn the key. The transmission case can be covered by any suitable covering.

It will be noted that the knob 38 cannot be rotated when the balls 47 are within the recess 48.

In the use of the device, when the owner or other authorized person leaves the automobile, the gear wheel 11 is moved into the neutral position as shown in Figures 3 and 4 by the movement of the shifting lever and the knob 38 is turned to move the bolt into intermeshing position with the teeth of the gear wheel as shown in Figures 5 and 6. The key 40 is then rotated to move the balls 47 into the recess 48 and the key is removed. The gear wheel 11 cannot be rotated and will thereby lock the shaft 10 against rotation. Furthermore the gear wheel 11 cannot be shifted lengthwise on the shaft 10.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In combination with a transmission gear case having a gear rotatable and slidable on a shaft, a transmission lock for motor vehicles comprising a housing having a vertical bore and a horizontal slideway, a bolt in the slideway having notches adapted to embrace teeth of the gear and lock same against rotating or sliding, a spindle having a hand grip for actuating the bolt, means for locking the spindle and means for aligning the locking mechanism.

2. In combination with a transmission gear case having a gear rotatable and slidable on a shaft; a housing communicating with the interior of the case through a slideway and having a bore at right angles to the slideway and two sets of depressions in the wall of the bore; a bolt slidable in the slideway and having a recess in its top and notches in one end adapted to embrace teeth on the gear and hold same against rotary and sliding movement; a spindle, having a transverse bore and a recess in its top, rotatable in the housing; a coiled spring in the transverse bore; a steel ball at either end of the spring adapted to be thrust by the spring into one set of depressions in the walls of the bore for determining the position of the bolt; a projection, eccentric with the axis of the spindle, extending from the bottom thereof into the recess in the bolt whereby rotating the spindle will reciprocate the bolt; a sleeve secured to the spindle and having apertures in its walls adapted to align with the other set of depressions in the walls of the bore; an actuator, having recesses in its sides adapted to align with the apertures in the sleeve, rotatable in the recess in the spindle; steel balls in the apertures in the sleeve and extending into the recesses in the actuator; a lock in the recess in the spindle and having a key for rotating the actuator whereby the balls may be forced outwardly into the upper set of depressions in the wall of the bore for locking the spindle against rotation, and a handle secured to the spindle for rotating same.

In testimony whereof I have signed my name to this specification.

JESSEE M. WHITE.